(12) United States Patent
Haas

(10) Patent No.: US 8,254,378 B2
(45) Date of Patent: Aug. 28, 2012

(54) STRICT-SENSE MINIMAL SPANNING SWITCH NON-BLOCKING ARCHITECTURE

(75) Inventor: Wally Haas, Mount Pearl (CA)

(73) Assignee: Altera Canada Co., Halifax, NS (CA)

( * ) Notice: Subject to any disclaimer, the term of this patent is extended or adjusted under 35 U.S.C. 154(b) by 264 days.

(21) Appl. No.: 12/554,043

(22) Filed: Sep. 4, 2009

(65) Prior Publication Data

US 2011/0019666 A1  Jan. 27, 2011

Related U.S. Application Data

(60) Provisional application No. 61/227,923, filed on Jul. 23, 2009.

(51) Int. Cl.
*H04L 12/50* (2006.01)
(52) U.S. Cl. ........................ 370/388; 370/537
(58) Field of Classification Search .................. 370/509, 370/510, 386–391, 413–419, 532–540
See application file for complete search history.

(56) References Cited

U.S. PATENT DOCUMENTS

| | | | |
|---|---|---|---|
| 5,974,058 A * | 10/1999 | Burns et al. | 370/538 |
| 6,704,307 B1 * | 3/2004 | Graves et al. | 370/372 |
| 6,807,186 B2 | 10/2004 | Dally et al. | |
| 6,870,838 B2 | 3/2005 | Dally | |
| 7,020,135 B2 | 3/2006 | Klausmeier et al. | |
| 7,113,505 B2 | 9/2006 | Williams | |
| 7,260,092 B2 | 8/2007 | Dally | |
| 7,301,941 B2 | 11/2007 | Dally | |
| 7,349,387 B2 | 3/2008 | Wu | |
| 7,525,995 B2 | 4/2009 | Iny | |
| 2001/0033569 A1 | 10/2001 | Dally | |
| 2001/0033584 A1 | 10/2001 | Dally | |
| 2001/0053160 A1 | 12/2001 | Dally | |
| 2002/0181482 A1 | 12/2002 | Dally et al. | |
| 2003/0099231 A1 | 5/2003 | Betts et al. | |
| 2004/0062228 A1 | 4/2004 | Wu | |
| 2008/0317024 A1 | 12/2008 | Rygh et al. | |
| 2008/0317025 A1 | 12/2008 | Manula et al. | |
| 2009/0073967 A1 * | 3/2009 | How et al. | 370/359 |
| 2010/0215060 A1 * | 8/2010 | Haas | 370/509 |

* cited by examiner

*Primary Examiner* — Chuong T Ho
(74) *Attorney, Agent, or Firm* — Ropes & Gray LLP

(57) ABSTRACT

The present invention discloses an apparatus to implement a m=n Non-Blocking Minimal Spanning Switch, where n=the total number of data input signals and m=the total number of data output signals and m=the number of crossbar connections in each switch. Data is input to the switch as a plurality of frames, whereby each crossbar connection contains a framer which detects framing patterns in the data. Skewed data is re-aligned and buffered so that the data output by each crossbar connection is equal and identical, thus any crossbar connection may be used to ensure a connection, eliminating the possibility of data interrupts.

12 Claims, 6 Drawing Sheets

STRICT-SENSE MINIMAL SPANNING SWITCH NON-BLOCKING ARCHITECTURE

CROSS-REFERENCE TO RELATED APPLICATIONS

Claims priority to U.S. Provisional Application No. 61/227,923 "Strict-Sense Minimal Spanning Switch Non-Blocking Architecture," originally filed Jul. 23, 2009.

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Technical Field of the Invention

The present invention provides a method and apparatus for implementing a non-blocking minimal spanning switch.

2. Background of the Invention

Telecommunication systems require switching networks to transmit data signals, or messages, from one point of the network to another point of the network. Many systems often employ the Clos Network, a type of switch network, for data transfer. The Clos Network is a multi-stage switch network, where each stage consists of a crossbar or crossbar switch. The system can be arranged into three stages: the ingress stage; the middle stage; and the egress stage. A total of n inputs are allowed into the ingress stage, where n=the total number of data input signals which are transmitted into the total crossbar connections (r) of the ingress stage (or any other stage). The data input into the ingress stage is subsequently output from the ingress stage; a total of m outputs are allowed, where m=the total number of data output signals which are transmitted out of the ingress stage and m=the total number of crossbar connections located in the middle stage. One connection is provided to allow the data from the (n−1) data inputs of the ingress stage to be transmitted out of the ingress stage and into the middle stage, and one connection is provided to allow this data to be transmitted out of the middle stage and into the egress stage. The classic Clos Network switch fabric is illustrated in FIG. 7.

Charles Clos further defines a Strict-Sense Non-Blocking Clos Network, where unused ingress crossbar connections are connected to unused egress crossbar connections, where m≧(2n−1). In a typical three stage Clos Network, to guarantee the connection of n connections, (2n−1) crossbar connections are required in the middle stage; with (n−1) data inputs active in the ingress stage crossbar connections, and another (n−1) data inputs potentially active in the egress stage crossbar connections, (2n−2) crossbar connections are required in the middle stage to allow the connection, where (n−1)+(n−1)=(2n−2). However, as (2n−2) crossbar connections may be unable to provide every necessary connection, an extra crossbar is provided to ensure Strict-Sense Non-Blocking, with (2n−1) middle stage crossbar connections.

(2n−1) middle stage crossbar connections would consume a large amount of resources, but in a Clos Network, m≧(2n−1) is necessary to maintain Strict-Sense Non-Blocking. When implementing a Clos Network which does not adhere to m≧(2n−1), the data connections may need to be re-routed in order to establish new connections, and such re-routing would result in interrupted or blocked connections, i.e., dropped telephone connections.

One method of minimizing the number of crossbar connections in the middle stage is through the use of a Non-Blocking Minimal Spanning Switch. When using a Non-Blocking Minimal Spanning Switch system, the connections between the ingress stage, middle stage and egress stage are symmetrical, with n ingress stage crossbar connections, n middle stage crossbar connections and n egress stage crossbar connections. This is achieved through the use of multiple sub-switches located in each stage; as an example a 4×4 switch including two input crossbar connections and two output crossbar connections are used. In a Non-Blocking Minimal Spanning Switch system, any data input signal input to any ingress location may be output from any egress location provided there is an open connection and an open path; however, signals can be blocked when they arrive from the ingress stage to the middle stage where the sub-switch locations are already in use, requiring other signals to be re-routed to ensure transmission. Such re-routing of signals is undesirable; the signals being transmitted are already carrying data, thus re-routing the data signal would again result in interrupted or blocked connections, i.e., dropped telephone connections.

Therefore, a method of re-routing the data signals transmitted through switching fabrics, without causing such interruptions, is required.

SUMMARY OF THE INVENTION

The present invention discloses a novel Strict-Sense Minimal Spanning Non-Blocking Architecture for use in frame-based data communications networks, providing the ability to re-route a telecommunications connection without interrupting the data signal. To maximize efficiency, the amount of logic duplicated on each data stream is minimized through the use of a n framer system, where n=the total number of framers in the system. In addition, n=the total number of data input signals which are transmitted into the crossbar connections (r) of the system. In the present invention, a "framer" refers to a machine which recognizes inherent framing patterns in transmitted data which occurs at predictable intervals. In the n framer system, each of the n bit streams enters n framers at a crossbar connection, and the n framers subsequently determine the inherent framing patterns within the transmitted data which are necessary for re-alignment. From these inherent framing patterns, the n framers can derive an arbitrary frame start signal, or the "start of frame." The start of frame, as derived by the n framers, indicates to the n framers to write the transmitted data into a specific, but arbitrary location(s) of n buffers. These arbitrary locations of n buffers represent the offsetting bit location in each of the n buffers where the n framers are to start writing the transmitted data to allow the data to be written into the n buffers in a re-aligned fashion. A multiplexer can then read out the realigned data from the n buffers and select from any of the re-aligned data signals to provide a single data output signal. In an illustrative embodiment of the invention, the n incoming data input signals are transmitted to n framers, where each of the n incoming data input signals are divided into d data signals, where d can be any arbitrary and user-definable amount of data signals. This provides a total of x internal data signals, as n×d=x. The x internal data signals are then written into a specific, but arbitrary location(s) of x buffers. A multiplexer can then read out the realigned data from the x buffers and select one, single data output signal; i.e., each crossbar connection has one data output signal, therefore m crossbar connections have m data output signals. Through this method, each crossbar connection of the switch will output the exact same data in each of the m data output signals. Therefore, when any of m crossbar connections (where m=the total number of data output signals switches from one sub-switch to another sub-switch, no interruption occurs; as the data on each sub-switch within a crossbar connection is identical, any connection can be successfully used by the switch.

DETAILED DESCRIPTION OF THE INVENTION

Figure 1:
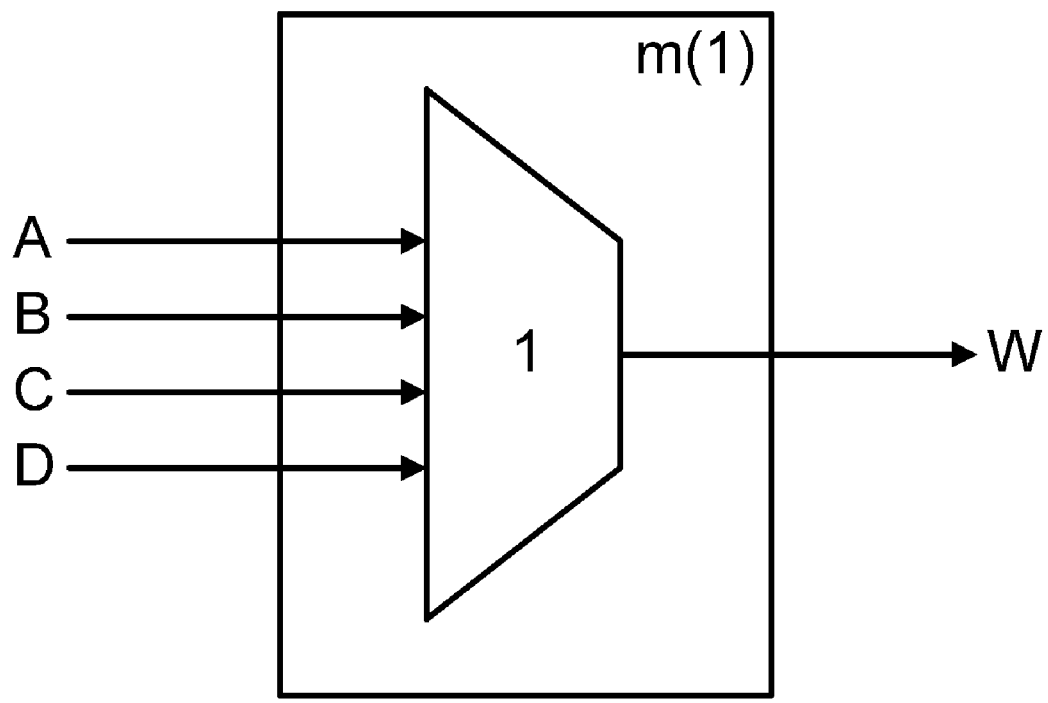
FIG. 1 is a block diagram illustrating four inputs and one output of a switch (prior art).
Figure 2:
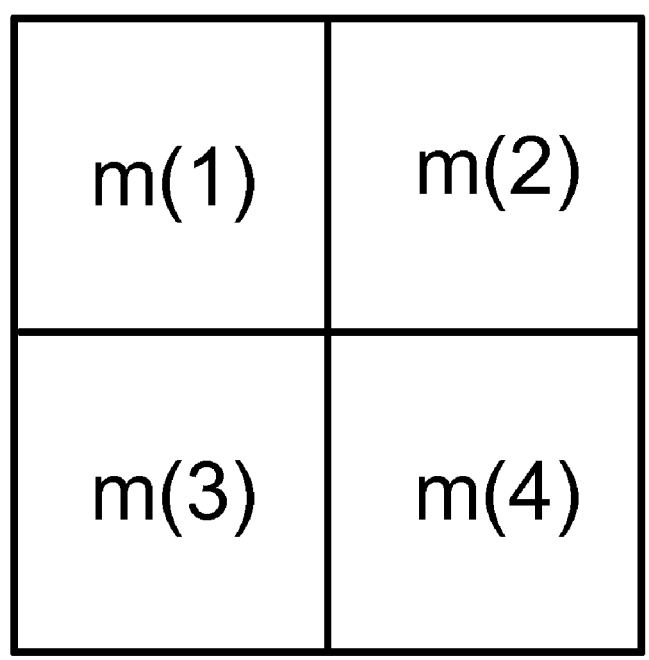
FIG. 2 is a block diagram illustrating the basic structure of a 4×4 switch (prior art).
Figure 3:
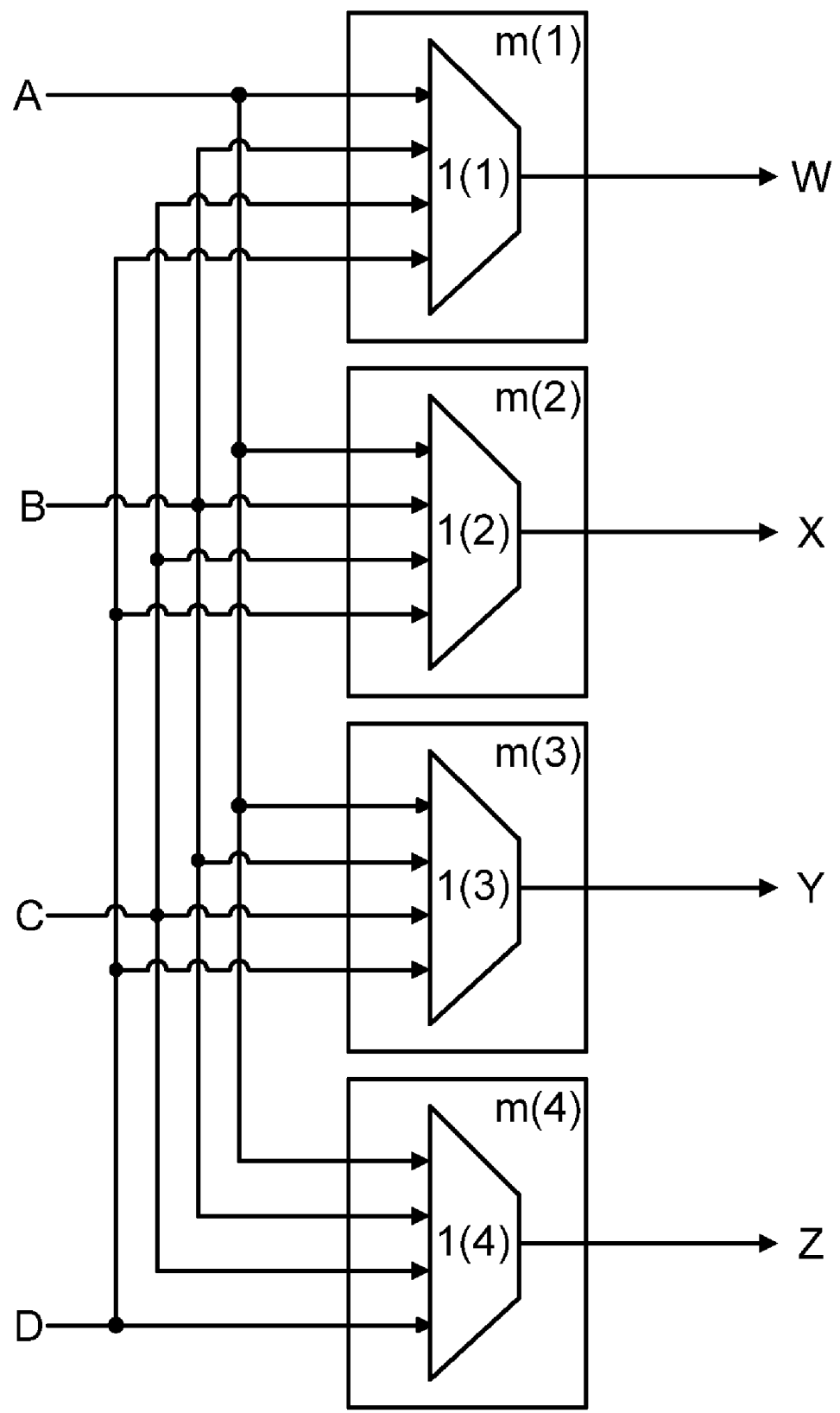
FIG. 3 is a block diagram illustrating four data signals input into a 4×4 switch (prior art).

An illustrative embodiment of the invention employs a n framer system as applied to a 4×4 switch. The crossbar connections employed may be Field Programmable Gate Arrays (FPGAs) or any other logic circuitry element. It should be noted that this example is provided for illustrative purposes only and is not meant to limit the scope of the invention, as any size switch can be accommodated. In the 4×4 switch, each of the crossbar connections m has four separate data input locations and one single data output location. This is illustrated in FIG. 1, where four data input signals A, B, C and D enter a single crossbar connection m(1), where multiplexer (1) selects one of data input signals A, B, C and D and subsequently outputs the signal from the system through the single data output location; this is illustrated as data output signal W. As illustrated in FIG. 2, the 4×4 switch is composed of four crossbar connections, m(1), m(2), m(3) and m(4). The input of the four data input signals A, B, C and D into the 4×4 switch is illustrated in FIG. 3, where each of the four data input signals A, B, C and D are input into each of the four crossbar connections, m(1), m(2), m(3) and m(4); the four data input signals A, B, C and D transmitted into each of the four crossbar connections, m(1), m(2), m(3) and m(4) provides a total of 16 data inputs to the 4×4 switch. However, each of multiplexers 1(1), 1(2), 1(3) and 1(4), located in crossbar connections, m(1), m(2), m(3) and m(4), respectively, select from the four data inputs to provide one data output for each of crossbar connections m(1), m(2), m(3) and m(4), for a total of four data output signals, W, X, Y and Z. As illustrated in FIG. 3, data output signal W is output from m(1), data output signal X is output from m(2), data output signal Y is output from m(3), and data output signal Z is output from m(4).

Figure 4:
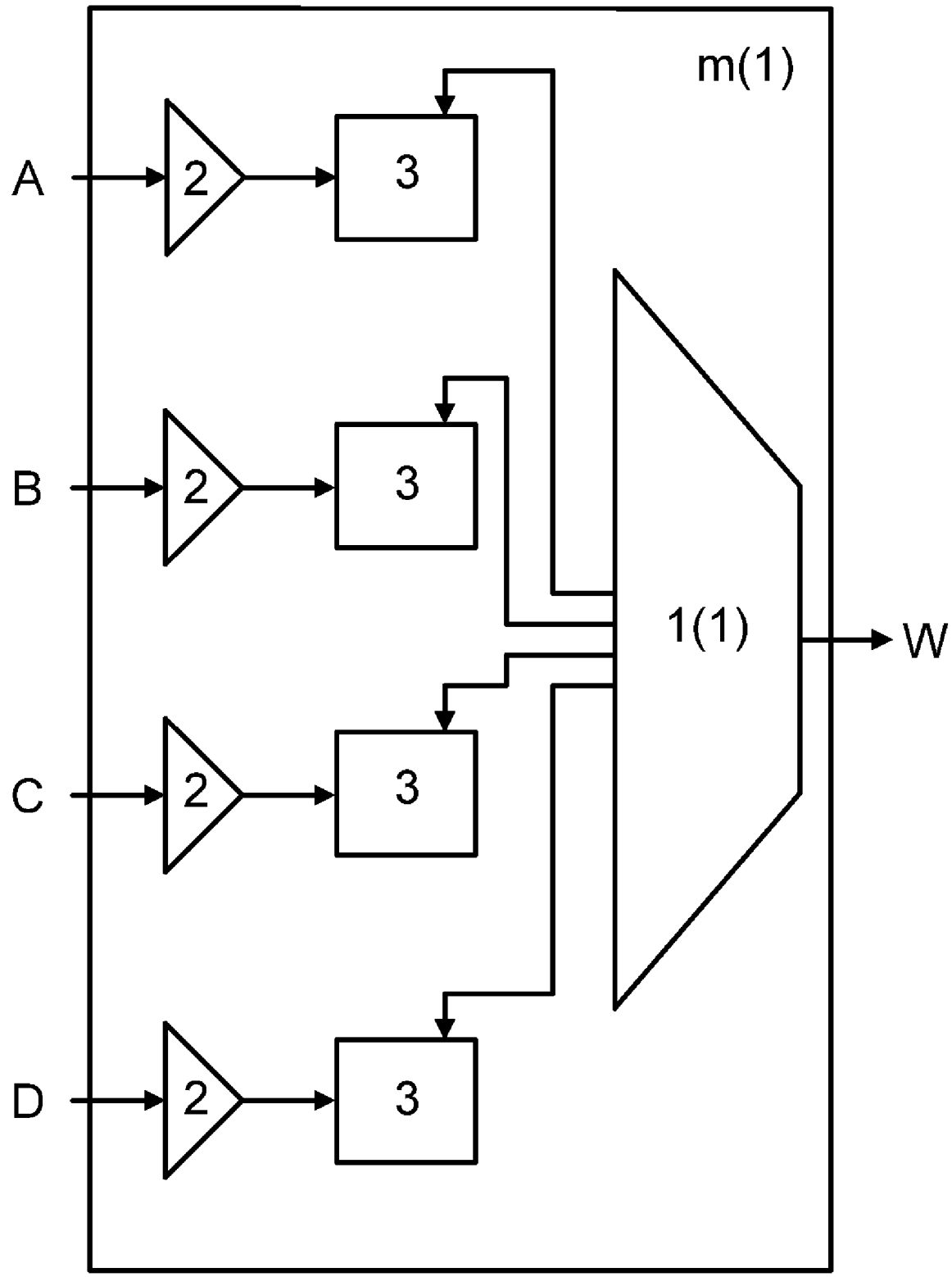
FIG. 4 is a block diagram illustrating four data inputs and one data output in accordance with an illustrative embodiment of the present invention.

FIG. 4 provides an illustrative embodiment of the Strict-Sense Minimal Spanning Non-Blocking Architecture applied to a 4×4 switch system. As illustrated, each of data input signals A, B, C and D are fed into their respective data input locations of crossbar connection m(1). Please note that each of data input signals A, B, C and D are likewise fed into respective data input locations of crossbar connections m(2), m(3) and m(4), as the internal circuitry of the crossbar connection m(1) is identical to the internal circuitry of m(2), m(3) and m(4); thus FIG. 4 can be considered as representation of any of crossbar connections m. As illustrated in FIG. 4, the data input to each of data input locations A, B, C and D enters one of framers (2). The framers (2) are able to recognize the start of frame, or the first byte of the frame. Framers (2) detect the start of frame in the incoming data by identifying the Frame Alignment Signal (FAS), an inherent and repeating framing pattern. With the start of frame known, the four data input signals A, B, C and D can be written into buffers (3) in a re-aligned fashion, writing the start of frame, or any other common starting byte, into a first common and specific location of each of buffers (3), despite any difference in the arrival times for each of data input signals A, B, C and D. Multiplexer 1(1) can now read data out of a second common and specific location of each of buffers (3). Please note that these common first and second locations in each of buffers (3) can be any arbitrary and user-definable data locations. A pointer from multiplexer 1(1) reads the re-aligned data out of the second common and specific location of each of buffers (3), ensuring that re-aligned and skew-free data is read from the buffers, despite any difference in arrival times between data input signals A, B, C and D. Multiplexer 1(1) now selects from the data input signals A, B, C and D to provide a single data output, W.

Figure 6:
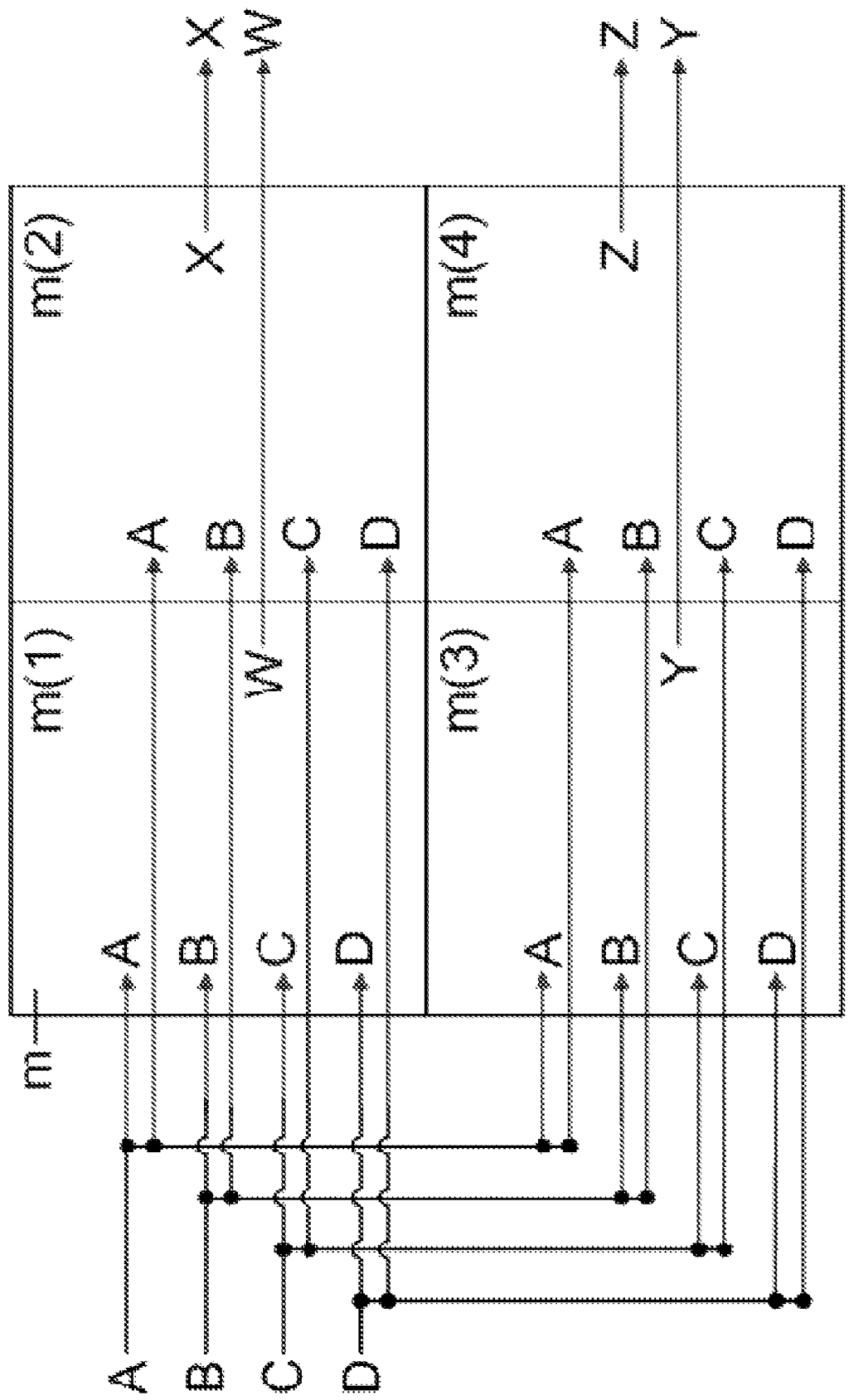
FIG. 6 is a block diagram illustrating four data signals input to four crossbar connections and four data signals output from the four crossbar connections in accordance with an illustrative embodiment of the present invention.
Figure 7:
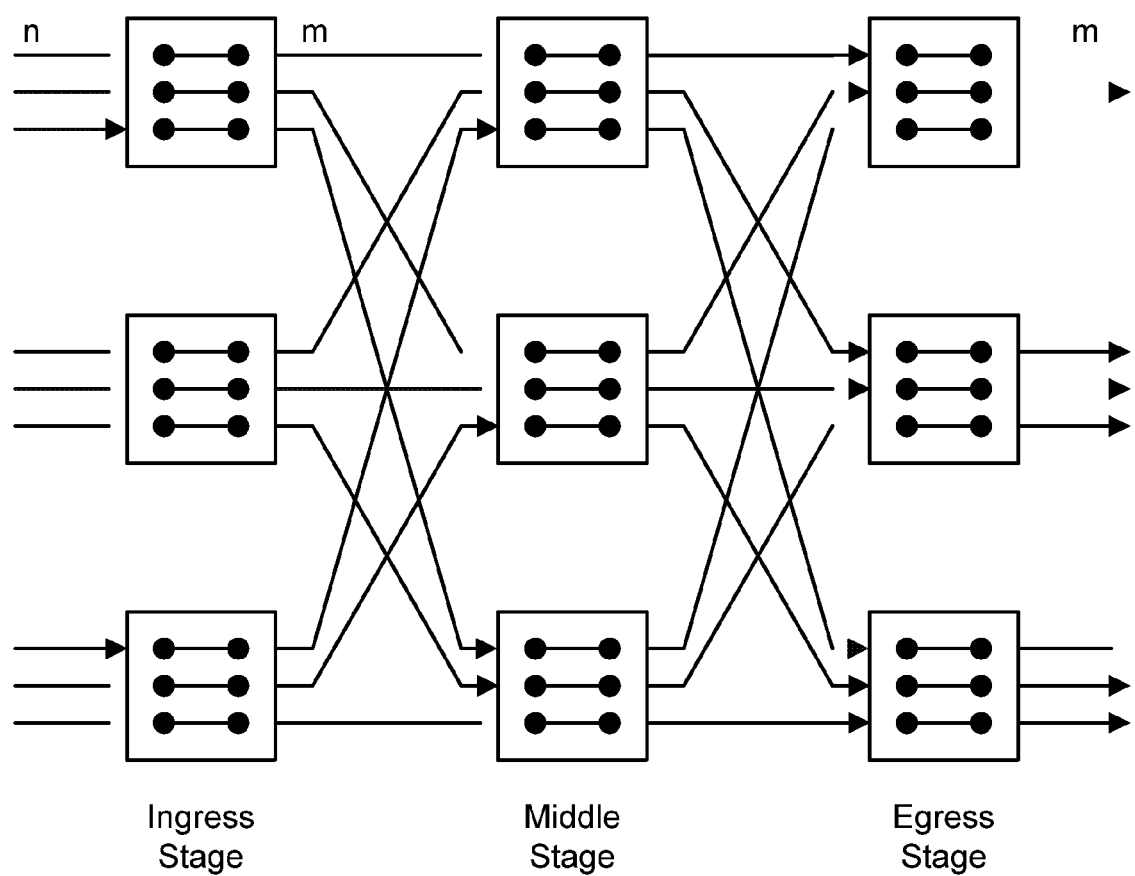
FIG. 7 is a block diagram illustrating a simplified version of the classic Clos Network switch fabric (prior art).

The full 4×4 switch is illustrated in FIG. 6, where the four data input signals A, B, C and D, are input into each of the four crossbar connections m(1), m(2), m(3) and m(4). Once the data is selected from the four input signals of each of the four crossbar connections m(1), m(2), m(3) and m(4) via the internal circuitry illustrated in FIG. 4, one data signal is output from each of the four crossbar connections m(1), m(2), m(3) and m(4), for a total of four data signals output from the system. This is illustrated in FIG. 6, where the four data output signals, W, X, Y and Z, are input into each of the four crossbar connections m(1), m(2), m(3) and m(4). Each of the data output signals, W, X, Y and Z will carry identical data, thus any of crossbar connections m(1), m(2), m(3) or m(4) may be chosen to make a connection.

DETAILED DESCRIPTION OF AN ILLUSTRATIVE EMBODIMENT OF THE INVENTION

Figure 5:
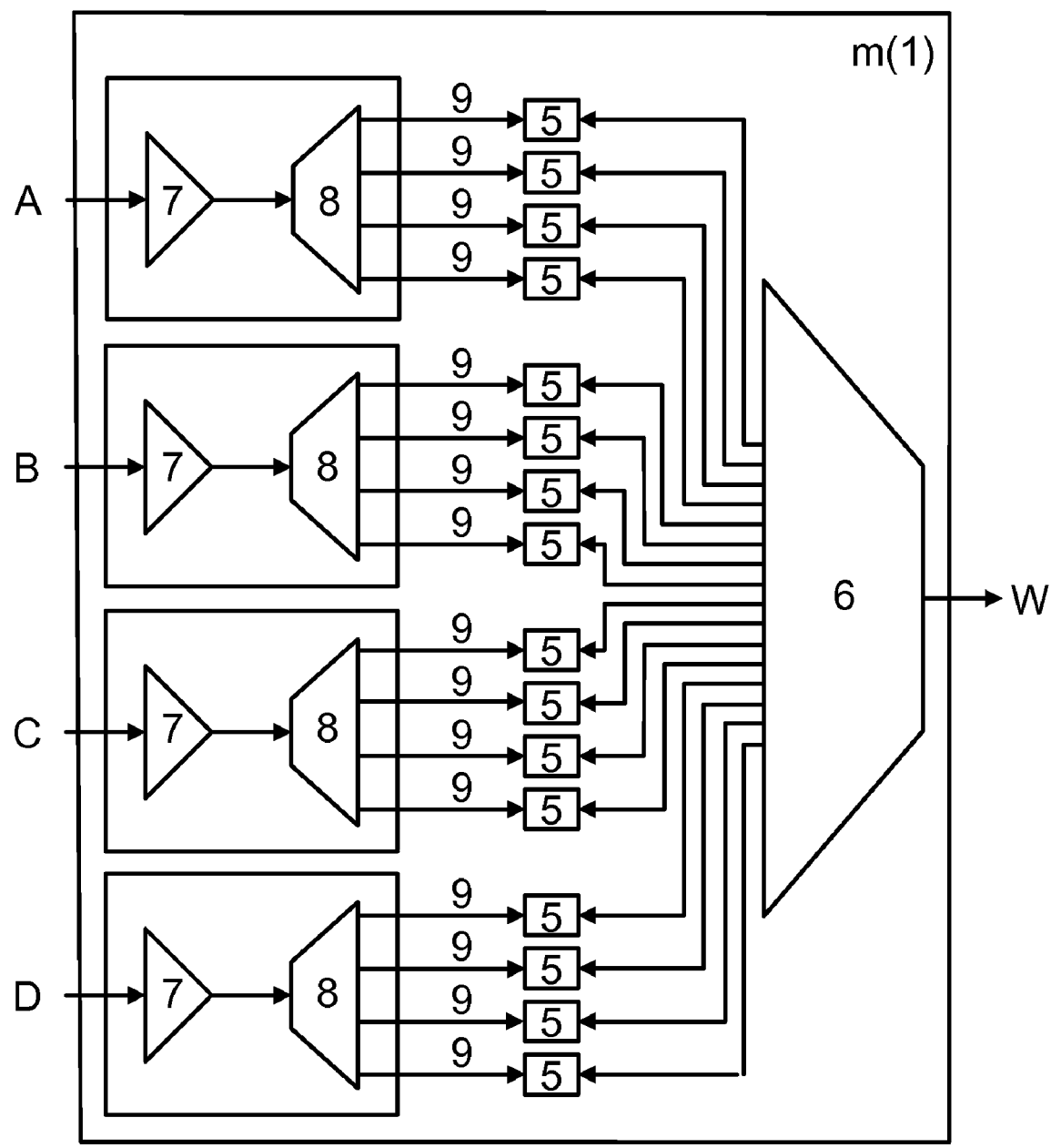
FIG. 5 is a block diagram illustrating the internal circuitry of each sub-switch in accordance with an illustrative embodiment of the present invention.

FIG. 5 illustrates a further illustrative embodiment of the present invention, employing a trunk framing system, where a trunk lane allows for one or more logical lanes in a single trunk lane. This illustrative embodiment of the invention is provided for illustrative purposes only and is not meant to limit the scope of the invention, as the invention may be applied to time switches or combinational space-time switches. The invention again employs a n framer system as applied to a 4×4 switch. The crossbar connections employed may be Field Programmable Gate Arrays (FPGAs) or any other logic circuitry element. It should be noted that this example is provided for illustrative purposes only and is not meant to limit the scope of the invention, as any size switch can be accommodated. As illustrated in FIG. 5, trunk framers (7) receive the data input signals A, B, C and D, identify the start of frame, and therefore identify the frame alignment for each of data input signals A, B, C and D. With the framing pattern identified, de-multiplexers (8) divide each of trunk lanes A, B, C and D into four logical lanes (9), for a total of 16 logical lanes (9) in the system. Therefore, in a 4×4 switch, 64 logical lanes would exist within the 4 crossbar connections. As illustrated, with the start of frame known, each of the 16 logical lanes (9) within a single crossbar connection can be written into one of buffers (5) in a re-aligned fashion, with the start of frame, or any other common starting byte, written into a first common and specific location of each of buffers (5), despite any difference in the arrival times for each of the 16 logical lanes (9). The data from each of the logical lanes (9) remains buffered in buffers (5) until multiplexer (6) sends a pointer to each of the 16 buffers (5) to read data out of a second common and specific location of each of buffers (5). Again, this ensures that multiplexer (6) reads out re-aligned and skew-free data from each of buffers (6), despite any difference in arrival times between data input signals A, B, C and D, or any timing differences between logical lanes (9). Multiplexer (6) now selects from the 16 logical lanes (9) to provide a single data output, W.

Through using this Strict-Sense Minimal Spanning Non-Blocking Architecture, the present invention ensures that each of the four crossbar connections m(1), m(2), m(3) and m(4) output the exact same data in each of the four data output signals, W, X, Y and Z, respectively. Therefore, when the 4×4 switch switches from one of crossbar connections m(1), m(2), m(3) or m(4), to any other of crossbar connections m(1), m(2), m(3) or m(4), no interruption occurs; the data on each crossbar connection m(1), m(2), m(3) and m(4) is identical, thus any connection can be used for the switch. This allows for the use of a m=n Non-Blocking Minimal Spanning Switch, where n=the total number of data input signals and m=the total number of data output signals and m=the number of crossbar connections in each switch, while eliminating the possibility of data interrupts.

I claim:

1. An apparatus comprising:
a non-blocking minimal spanning switch comprising:
 (a) receiver circuitry configured to receive a plurality of data transmitted as a plurality of frames across a plurality of transmitting lanes, wherein said plurality of data comprises n data input signals;
 (b) a switch comprising m crossbar connections, wherein each of said n data input signals are input to each of said m crossbar connections, for a total of (m×n) switch input signals, wherein m=n, and wherein:
  each of said m crossbar connections comprises (m×n) framers,
  each of said (m×n) switch input signals are input to one of said (m×n) framers, and
  said (m×n) framers determine a start of frame signal in each of said (m×n) switch input signals, said start of frame signal indicating the starting bit of each of said plurality of frames; and
 (c) at least m multiplexers, wherein at least one of said m multiplexers is located within each of said m crossbar connections, whereby said m multiplexers selects data from one of said n data input signals and thereby outputs a single data output signal from each of said m crossbar connections, for a total of m switch output signals.

2. The apparatus of claim 1, wherein each of said m crossbar connections further comprises (m×n) buffers, whereby each of said (m×n) framers employ said start of frame signal to re-align said (m×n) switch input signals and subsequently each of said (m×n) framers write said (m×n) switch input signals into a common input location of each of said (m×n) buffers, providing said (m×n) buffers with equal and identical (m×n) data output signals, thereby said m multiplexers select said m switch output signals from any of said (m×n) data output signals to output one of said m switch output signals from each of said m crossbar connections.

3. The apparatus of claim 2, wherein each of said (m×n) buffers are First-In-First-Out (FIFO) buffers.

4. An apparatus comprising:
a non-blocking minimal spanning switch comprising:
 (a) receiver circuitry configured to receive a plurality of data transmitted as a plurality of frames across a plurality of transmitting lanes, wherein said plurality of data comprises n trunk input signals;
 (b) a switch comprising m crossbar connections, wherein each of said n trunk input signals are input to each of said m crossbar connections, for a total of (m×n) switch input signals, wherein m=n and wherein:
  each of said m crossbar connections comprises (m×n) trunk framers,
  each of said (m×n) trunk input signals are input to one of said (m×n) trunk framers, and
  said (m×n) trunk framers determine a start of frame signal in each of said (m×n) trunk input signals, said start of frame signal indicating the starting bit of each of said plurality of frames; and
 (c) at least m multiplexers, wherein at least one of said m multiplexers is located within each of said m crossbar connections, whereby said m multiplexers selects data from one of said n trunk input signals or, where said n trunk input signals are divided into X logical lanes, said m multiplexers selects data from one of said X logical lanes, thereby said m multiplexers output a single trunk output signal from each of said m crossbar connections, for a total of m switch output signals.

5. The apparatus of claim 4, wherein said (m×n) trunk framers further comprise at least one de-multiplexer to divide each of said n trunk input signals into d logical data signals, whereby n×d=X, thereby providing a total of X logical lanes within each of said m crossbar connections.

6. The apparatus of claim 5, wherein each of said m crossbar connections further comprises X buffers, whereby each of said (m×n) framers employ said start of frame signal to re-align said (m×n) switch input signals and subsequently each of said (m x n) framers, coupled to said de-multiplexers, write said X logical lanes into a common input location of each of said X buffers, providing said X buffers with equal and identical X logical output lanes, thereby said m multiplexers select said m switch output signals from any of said X logical lanes to output one of said m switch output signals from each of said m crossbar connections.

7. The apparatus of claim 6, wherein each of said X buffers are First-In-First-Out (FIFO) buffers.

8. A method comprising:
 (a) receiving, with a non-blocking minimal spanning switch, a plurality of data transmitted as a plurality of frames across a plurality of transmitting lanes, wherein said plurality of data comprises n data input signals;
 (b) inputting each of said n data input signals to each of m crossbar connections of a switch, for a total of (m×n) switch input signals, wherein m=n and wherein:
  each of said m crossbar connections comprises (m×n) trunk framers, each of said (m×n) trunk input signals are input to one of said (m×n) trunk framers, and said (m×n) trunk framers determine a start of frame signal in each of said (m×n) trunk input signals, said start of frame signal indicating the starting bit of each of said plurality of frames; and (c) selecting, with at least one of m multiplexers, data from one of said n data input signals, and outputting a single data output signal from each of said m crossbar connections, for a total of m switch output signals, wherein:

at least one of said m multiplexers is located within each of said m crossbar connections; and each of said m crossbar connections output equal and identical m output signals, thus said switch can select any of said m crossbar connections to ensure a connection.

9. The method of claim 8, wherein each of said m crossbar connections further comprises a plurality of buffers, whereby each of said (m×n) framers employ said start of frame signal to re-align said (m×n) switch input signals and subsequently each of said (m×n) framers write said (m×n) switch input signals into a common input location of each of said plurality of buffers, providing said plurality of buffers with a plurality of data output signals, wherein said plurality of data output signals are equal and identical, thereby said m multiplexers select said m switch output signals from any of said plurality of data output signals to output one of said m switch output signals from each of said m crossbar connections.

10. The method of claim 9, wherein said plurality of buffers are First-In-First-Out (FIFO) buffers.

11. The method of claim 8, wherein said plurality of transmitting lanes are a plurality of serial data transmitting lanes or said plurality of transmitting lanes are a plurality of trunk transmitting lanes.

12. The method of claim 11, wherein each of said plurality of trunk transmitting lanes are divided by at least one de-multiplexer into a plurality of logical lanes.

* * * * *